C. M. MOTTE.
DRIVING AND STEERING WHEEL.
APPLICATION FILED MAY 25, 1918.

1,306,554.

Patented June 10, 1919.
4 SHEETS—SHEET 1.

Inventor:
Charles Marius Motte
per H. W. Plucker
Attorney.

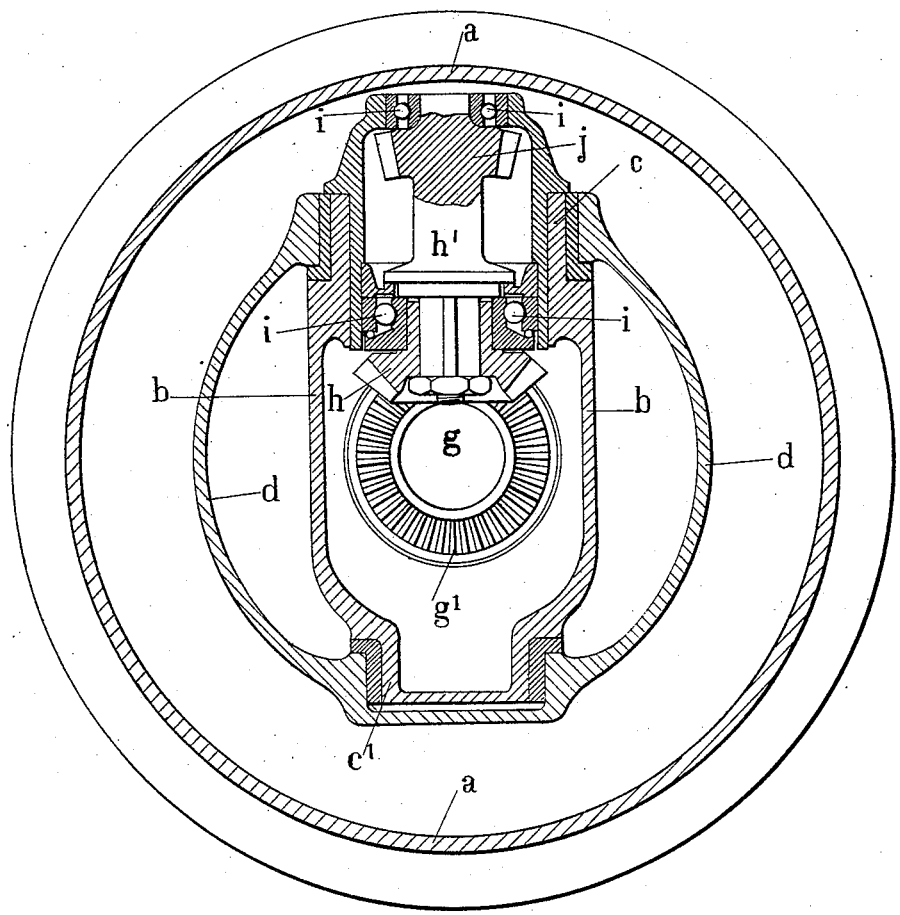

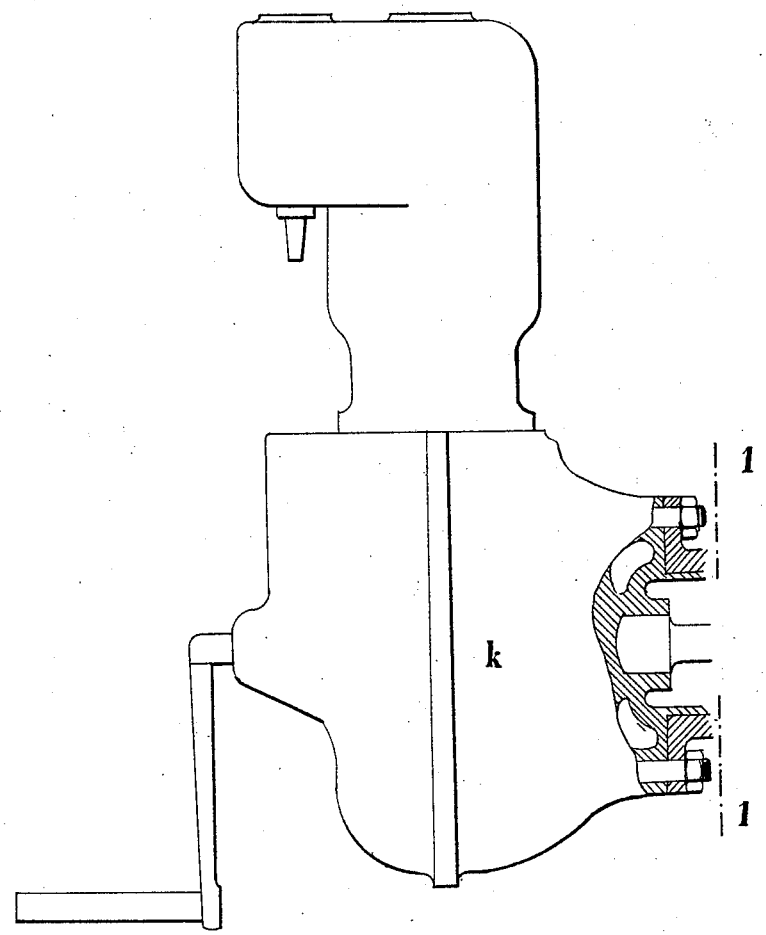

C. M. MOTTE.
DRIVING AND STEERING WHEEL.
APPLICATION FILED MAY 25, 1918.

1,306,554.

Patented June 10, 1919.
4 SHEETS—SHEET 4.

UNITED STATES PATENT OFFICE.

CHARLES MARIUS MOTTE, OF PARIS, FRANCE.

DRIVING AND STEERING WHEEL.

1,306,554.      Specification of Letters Patent.      Patented June 10, 1919.

Application filed May 25, 1918. Serial No. 236,632.

*To all whom it may concern:*

Be it known that I, CHARLES MARIUS MOTTE, of No. 53 Avenue Secretan, Paris, France, engineer, have invented Driving and Steering Wheels, of which the following is a full, clear, and exact description.

The present invention relates to a driving and steering wheel for vehicles in combination with other parts arranged in such a way that the device can act as a driving or steering wheel or as a driving wheel only.

The device according to the present invention is characterized essentially by:—

(1) The method of applying the motive power, which is effected inside the hub in the plane of rotation of the wheel.

(2) The device enabling the wheel to be steered consists of pivots located likewise in the plane of rotation of the said wheel and inside the hub.

(3) A carrying axle, upon which there may be mounted, on one side the motor, and on the other side the change speed gear and clutch, the whole forming a rigid unit, at the middle of which the wheel revolves in a vertical plane, and admits of being angularly displaced in the same plane for the purpose of steering the vehicle.

The present invention comprising the wheel, the motor, the change-speed gear, the clutch, the radiator and other fittings forms a compact unit making it possible to assemble quickly and easily light automobile vehicles, motor cars, tricars, or the like that are easy to steer and economical to maintain.

The present device is also applicable to motor farming, in so far that the device renders great services, in view of the fact that it admits of being readily coupled to all agricultural implements such as plows, reapers and binders, harrows, drills, vineyard implements and the like.

Moreover the arrangement and method of mounting the device enables three-wheeled vehicles to be constructed wherein one of the wheels may be employed either as a driving wheel and a steering wheel or else a driving wheel only.

By way of example the invention is illustrated in the accompanying drawings, in which:—

Fig. 2 is a cross-sectional elevation on the line A—A of Fig. 1.

Figure 3B:
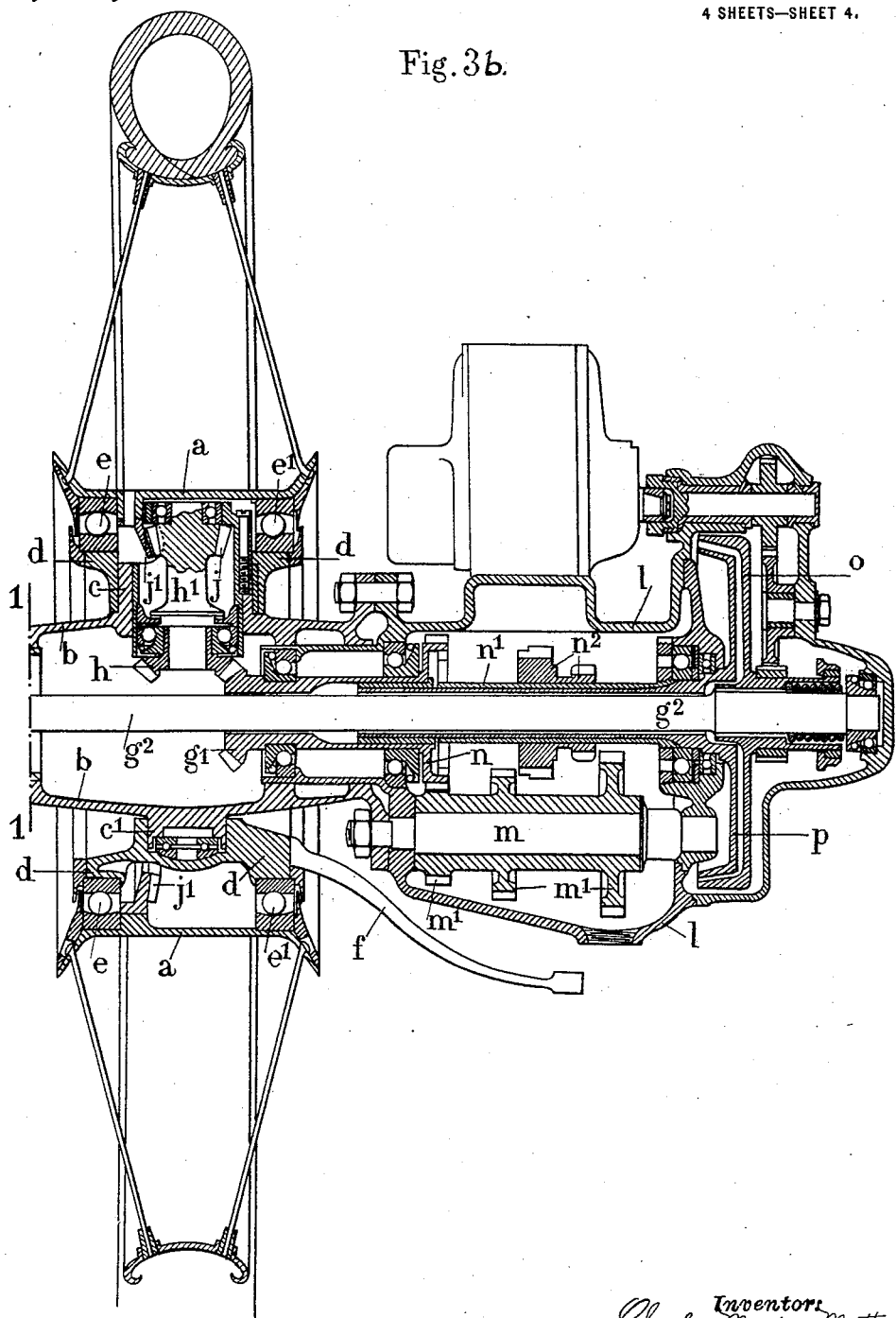

Figs. 3ª and 3ᵇ, when laid side by side, constitute a sectional elevation of the whole device.

Figure 1:
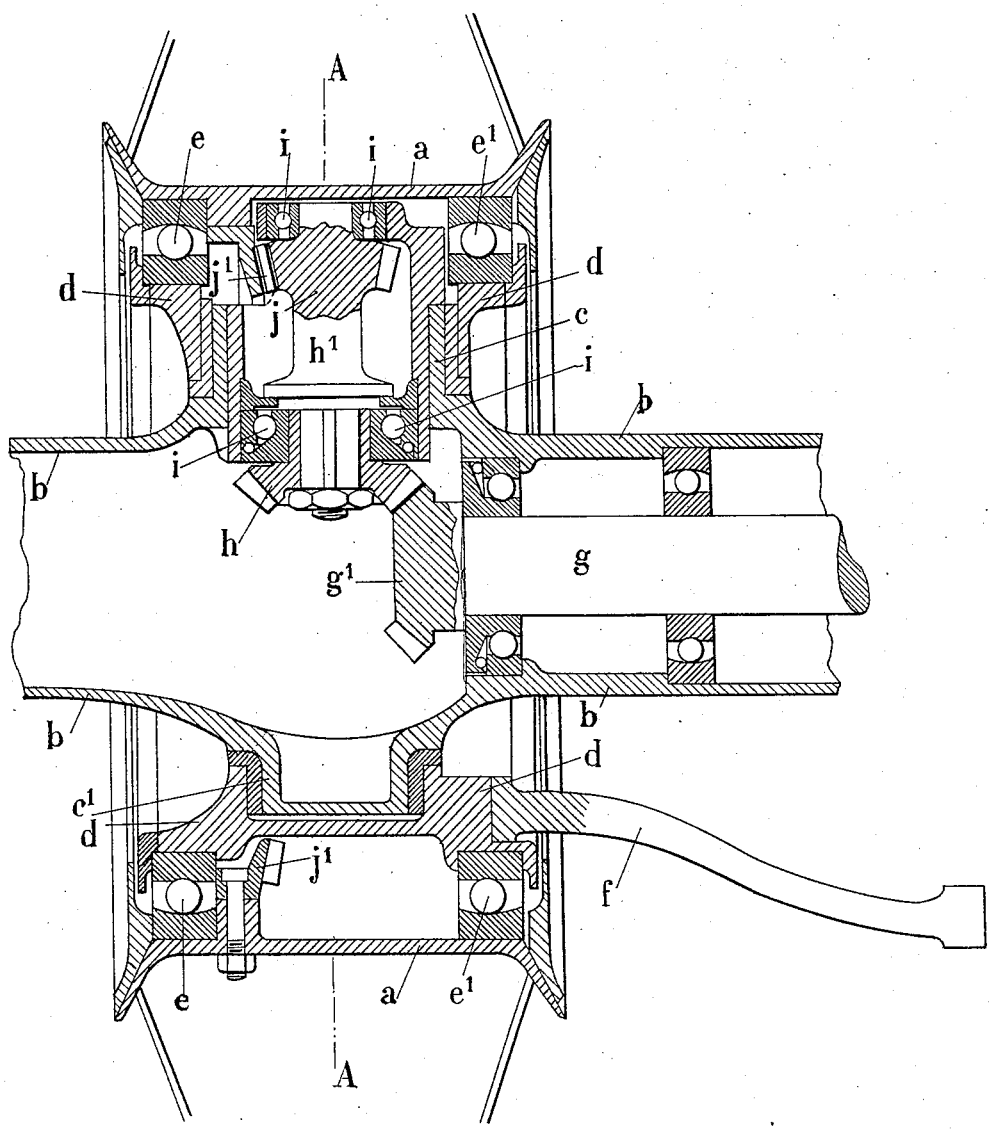
Figure 1 shows a longitudinal sectional elevation of the hub of the present device together with the members that effect the transmission of the motive power and the steering.

It will be seen from the drawing, (Figs. 1 and 2), the driving and steering wheel forming the subject-matter of the present invention comprises a hub $a$, to which is connected by means of metal spokes, the rim provided with solid or a pneumatic tire.

The said hub $a$ is traversed by a hollow axle body $b$, provided in the vertical plane of the wheel, with two trunnions $c$ and $c'$ engaged in two seatings formed in a metal rim $d$ of suitable cross section.

Between the rim $d$ and the internal periphery of the hub are arranged two sets of balls $e$ and $e'$ serving as ball bearings upon which the wheel turns.

The wheel may receive an angular displacement in the vertical plane by pivoting about the trunnions $c$ and $c'$. This movement is controlled by a lever $f$, virtually integral with the rim $d$.

The motion of the motor is transmitted to the wheel by a shaft $g$ placed in the axis of the hollow axle $b$, and provided at its extremity with a bevel pinion $g'$. The latter gears with a similar pinion $h$, mounted on a shaft $h'$, placed vertically in the axis of the wheel and engaged in the upper trunnion $c$.

This shaft rotates in two sets of balls $i$ serving as bearings and is provided at the top with a pinion $j$ gearing with a toothed rim $j'$, virtually integral with the hub $a$.

As hereinbefore described all the members that transmit motion are located inside the hub and these members are arranged in such a way that the drive of the wheel is always insured, however the latter may be rotated about its trunnions $c$ and $c'$ for steering purposes.

The wheel arranged in this way is therefore a driving wheel and a steering wheel. The wheel may be employed as a driving wheel by omitting the trunnions $c$ and $c'$ or by fixing the rim $d$ to these trunnions or to some other point on the axle $b$, or else by locking the steering lever.

It will be observed that the present driving and steering wheel forms part of balanced mechanism enabling an ordinary vehicle to be quickly and economically converted into an automobile vehicle.

The device illustrated in Fig. 3, comprises a driving and steering wheel arranged as hereinbefore described. The axle body $b$ supports on one side a single-cylinder or multi-cylinder motor $k$ and on the other side a casing $l$ containing the change-speed gear and the clutch.

The change-speed gear comprises a shaft $m$, provided with spur wheels $m'$ of various diameters. One of the said wheels is constantly meshing with a spur wheel $n$, mounted on a sleeve $n'$ upon which two other wheels $n^2$ are slidable, which are designed to gear with other wheels $m'$.

The motion of the motor $k$ is transmitted to the wheel by means of a shaft $g^2$, placed in the horizontal axis of the device and provided at its extremity with a clutch plate $o$ with a conical flange.

The flange of this plate may gear under the action of a suitable device, with another similar plate $p$, integral with the sleeve $n'$.

The latter is provided at its extremity with the pinion $g'$ actuating the wheel as hereinbefore set forth.

The present device may be supplemented by a radiator and any other suitable members. As the drawing shows the said device is perfectly balanced, and can be connected to a light vehicle or to various agricultural implements with the utmost facility.

Thus the device constitutes mechanism capable of being coupled to various kinds of machines.

It will be obvious that the power of the motor will vary according to the applications for which the device is intended.

The forms, dimensions and devices of detail may vary according to circumstances without departing from the principle of the invention, as defined by the appended claims.

What I claim and desire to secure by Letters Patent of the United States is:—

1. A single wheel tractor unit comprising a hollow axle, a wheel rotatably mounted on said axle, a source of power supported by said axle on one side of said wheel, a driving mechanism supported by said axle on the other side of said wheel, a connection between said source of power and said mechanism and a connection between said mechanism and said wheel, both connections being supported within said axle.

2. A single wheel tractor unit comprising a hollow axle, a wheel rotatably mounted on said axle, casings secured to said axle on both sides of said wheel, a source of power in one of said casings, a change speed gear and a clutch in the other casing, a connection between said source of power and said clutch, and a connection between said change speed gear and said wheel, both connections being supported within said axle.

3. A single wheel tractor unit comprising a hollow axle, a rim co-axial with said axle, said rim being adapted to pivot on said axle about an axis at right angles thereto, a wheel rotatably mounted on said rim, a source of power supported by said axle on one side of said wheel, a driving mechanism supported by said axle on the other side of said wheel, a connection between said source of power and said mechanism and a connection between said mechanism and said wheel, both connections being supported within said axle.

4. A single wheel tractor unit comprising a hollow axle having a substantially horizontal axis, a rim co-axial with said axle, said rim being adapted to pivot on said axle about a vertical axis, a wheel co-axial with and rotatably mounted on said rim, casings secured to said axle on both sides of said wheel, a source of power in one of said casings, a change speed gear and a clutch in the other casing, a connection between said source of power and said clutch, and a connection between said change speed gear and said wheel, both connections being supported within said axle.

5. A single wheel tractor unit comprising a hollow axle, a pair of radial trunnions on said axle, one of said trunnions being hollow, a rim pivotally mounted on said trunnions, a wheel co-axial with and rotatably mounted on said rim, casings secured to said axle on both sides of said wheel, a source of power in one of said casings, a change speed gear and a clutch in the other casing, a connection between said source of power and said clutch extending through said axle, and a connection between said change speed gear and said wheel extending through said axle and said hollow trunnion.

6. A driving and steering wheel comprising a hollow axle, two vertical radial trunnions on said axle, a rim encircling said axle, said rim being pivotally mounted on said trunnions, a steering lever connected to said rim, an annular hub rotatably mounted on said rim, a tread rim and spokes connecting said hub and tread rim, a motor carried by said axle at one end thereof, a change speed gear and a clutch carried by said axle at the other end thereof, a shaft extending through said axle and connecting said motor and clutch, and gears supported within said axle and one of said trunnions to transmit motion from said change speed gear to said hub.

This foregoing specification of my "driving and steering wheel" signed by me this 17th day of April, 1918.

CHARLES MARIUS MOTTE.

Witnesses:
CHAS. P. PRESSLY,
FRANÇOIS WEBER.